United States Patent
Lin et al.

(10) Patent No.: US 11,316,586 B2
(45) Date of Patent: Apr. 26, 2022

(54) FREQUENCY ADJUSTMENT FOR HIGH SPEED LTE DEPLOYMENTS

(71) Applicant: Telefonaktiebolaget LM Ericsson (publ), Stockholm (SE)

(72) Inventors: Xingqin Lin, Santa Clara, CA (US); Ansuman Adhikary, Telangana (IN); Ali S. Khayrallah, Mountain View, CA (US); Yi-Pin Eric Wang, Fremont, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 12 days.

(21) Appl. No.: 16/336,435

(22) PCT Filed: Sep. 19, 2017

(86) PCT No.: PCT/IB2017/055663
§ 371 (c)(1),
(2) Date: Mar. 25, 2019

(87) PCT Pub. No.: WO2018/055512
PCT Pub. Date: Mar. 29, 2018

(65) Prior Publication Data
US 2019/0222302 A1 Jul. 18, 2019

Related U.S. Application Data

(60) Provisional application No. 62/399,742, filed on Sep. 26, 2016.

(51) Int. Cl.
*H04B 7/185* (2006.01)
*H04L 27/00* (2006.01)
(Continued)

(52) U.S. Cl.
CPC ....... *H04B 7/18532* (2013.01); *H04B 7/1855* (2013.01); *H04B 7/2125* (2013.01);
(Continued)

(58) Field of Classification Search
CPC ............ H04B 7/18532; H04L 27/0014; H04L 27/2666; H04L 2027/0026; H04W 56/0035; H04W 84/005
See application file for complete search history.

(56) References Cited

U.S. PATENT DOCUMENTS 6,725,034 B1 * 4/2004 Diris .................... H04B 7/1855
455/12.1
8,027,285 B1 * 9/2011 Eyyunni ............ H04B 7/18515
370/315
(Continued)

FOREIGN PATENT DOCUMENTS

CN 101057443 A 10/2007
CN 101719771 A 6/2010
(Continued)

OTHER PUBLICATIONS

Chelli, Kelvin, "Doppler Shift Compensation in Vehicular Communication Systems," Master Thesis, Saarland University, Faculty of Natural Sciences and Technology I, Department of Computer Science, Mar. 25, 2015, URL: "https://pdrs.semanticscholar.org/8c04/0bbc82a2699cc752708e857e980161e117f0.pdf", 76 pages.
(Continued)

*Primary Examiner* — Rasheed Gidado
(74) *Attorney, Agent, or Firm* — Sage Patent Group

(57) ABSTRACT

Systems and methods relating to correction of a Doppler/frequency offset in a wireless communication system are disclosed. In some embodiments, a method of operation of a node comprises estimating a Doppler/frequency offset for a wireless device based on an uplink signal received from
(Continued)

the wireless device and providing a frequency adjustment to the wireless device that corrects for the Doppler/frequency offset. In this manner, the Doppler/frequency offset for a wireless device is determined and corrected.

10 Claims, 11 Drawing Sheets

(51) Int. Cl.
    *H04W 56/00* (2009.01)
    *H04L 27/26* (2006.01)
    *H04B 7/212* (2006.01)
    *H04W 84/00* (2009.01)
    *H04W 74/08* (2009.01)

(52) U.S. Cl.
    CPC ...... *H04L 27/0014* (2013.01); *H04L 27/2666* (2013.01); *H04W 56/0035* (2013.01); *H04B 7/18506* (2013.01); *H04L 2027/0026* (2013.01); *H04L 2027/0095* (2013.01); *H04W 74/0833* (2013.01); *H04W 84/005* (2013.01)

(56) References Cited

U.S. PATENT DOCUMENTS

| | | | | |
|---|---|---|---|---|
| 8,320,858 | B2* | 11/2012 | Ruelke | H04B 1/001 455/130 |
| 8,705,465 | B2* | 4/2014 | Tajima | H04W 76/18 370/329 |
| 9,307,424 | B2* | 4/2016 | Dural | H04W 24/02 |
| 9,391,592 | B2* | 7/2016 | Leyh | H03J 7/02 |
| 9,609,663 | B2* | 3/2017 | Xu | H04W 74/002 |
| 2005/0272379 | A1 | 12/2005 | Rotta et al. | |
| 2011/0092231 | A1* | 4/2011 | Yoo | H04J 11/005 455/501 |
| 2011/0311005 | A1* | 12/2011 | Andgart | H04L 27/2686 375/344 |
| 2013/0324070 | A1* | 12/2013 | Bennett | H04W 84/005 455/404.1 |
| 2013/0337759 | A1* | 12/2013 | Avivi | H04L 27/0014 455/255 |
| 2014/0029656 | A1 | 1/2014 | Lo et al. | |
| 2015/0181546 | A1* | 6/2015 | Freda | H04L 27/0014 370/336 |
| 2016/0134448 | A1* | 5/2016 | Choi | H04L 27/2647 370/343 |
| 2017/0142618 | A1* | 5/2017 | Hahn | H04W 36/0094 |
| 2017/0168163 | A1* | 6/2017 | Small | G01S 19/14 |
| 2018/0020330 | A1* | 1/2018 | Li | H04W 88/02 |
| 2018/0241508 | A1* | 8/2018 | Chervyakov | H04L 25/0224 |

FOREIGN PATENT DOCUMENTS

| | | |
|---|---|---|
| CN | 102754403 A | 10/2012 |
| CN | 103338508 A | 10/2013 |
| CN | 105207766 A | 12/2015 |
| WO | 2016003044 A1 | 1/2016 |

OTHER PUBLICATIONS

Nyongesa, F. et al., "Doppler Shift Compensation Schemes in VANETs," Hindawi Publishing Corporation, Mobile Information Systems, vol. 2015, Article ID 438159, Aug. 6, 2015, URL: "https://www.hindawi.com/journals/misy/2015/438159/", 12 pages.

Weils, David E., "Doppler Satellite Control," Geodesy and Geomatics Engineering, UNB, Technical Report, No. 29, Sep. 1974, URL: "http://www2.unb.ca/gge/Pubs/TR29.pdf", 300 pages.

Invitation to Pay Additional Fees and Partial Search Report for International Patent Application No. PCT/B2017/055663 dated Dec. 13, 2017, 16 pages.

International Search Report and Written Opinion for International Patent Application No. PCT/IB2017/055663 dated Apr. 26, 2018, 23 pages.

European Office Action issued in corresponding EP Application No. 17784395.0 dated Aug. 19, 2020, 07 Pages.

First Office Action for Chinese Patent Application No. CN 201780059002.X dated May 14, 2021, 15 pages (including English translation).

Second Chinese Office Action for Chinese Patent Application No. CN 201780059002.X dated Dec. 7, 2021, 12 pages (including English translation).

* cited by examiner

FREQUENCY ADJUSTMENT FOR HIGH SPEED LTE DEPLOYMENTS

RELATED APPLICATIONS

This application is a 35 U.S.C. § 371 national phase filing of International Application No. PCT/IB2017/055663, filed Sep. 19, 2017, which claims the benefit of provisional patent application Ser. No. 62/399,742, filed Sep. 26, 2016, the disclosures of which are hereby incorporated herein by reference in their entireties.

TECHNICAL FIELD

The present disclosure relates generally to frequency adjustment, high mobility Long Term Evolution (LTE), Doppler, and random access.

BACKGROUND

There has been a surge of interest in adapting Third Generation Partnership Project (3GPP) Long Term Evolution (LTE) to cater for different deployment scenarios. A new innovative trend is to provide "connectivity from the sky." To provide such connectivity, platforms being considered include: drones, balloons, aircraft, airships, and satellites. LTE has been designed for a terrestrial network and has not been optimized to provide "connectivity from the sky." In particular, compared to traditional terrestrial LTE infrastructure that is usually stationary, these new platforms in the sky are usually non-stationary and may move at high speeds.

In LTE, User Equipment devices (UEs) follow the following access procedures:

Cell search: Search and acquire synchronization to a cell in the network.

System information reading: Receive and decode system information necessary for proper operation in the network.

Random access: Once the system information has been correctly decoded, the UE can perform random access to access the network.

In the existing LTE random access design, random access serves multiple purposes such as initial access when establishing a radio link, scheduling request, etc. Among others, a main objective of random access is to achieve uplink synchronization, which is important for maintaining the uplink orthogonality in LTE. To preserve orthogonality among different UEs in an Orthogonal Frequency Division Multiple Access (OFDMA) or Single Carrier Frequency Division Multiple Access (SC-FDMA) system, the Time of Arrival (ToA) of each UE's signal needs to be within the Cyclic Prefix (CP) of the OFDMA or SC-FDMA signal at the base station.

LTE random access can be either contention-based or contention-free. The contention-based random access procedure consists of four steps, as illustrated in FIG. 1. Note that only the first step involves physical layer processing specifically designed for random access, while the remaining three steps follow the same physical layer processing used in uplink and downlink data transmission. For contention-free random access, the UE uses reserved preambles assigned by the base station. In this case, contention resolution is not needed, and thus only steps 1 and 2 are required.

In terrestrial LTE networks, the enhanced or evolved Node B (eNB) estimates the ToA from the received Msg1, which includes the random access preamble and Random Access Radio Network Temporary Identifier (RA-RNTI) of the UE, transmitted by the UE in step 1. Based on the estimate, the eNB feedbacks the acquired uplink timing in Msg2 (i.e., the random access response) to command the UE to perform timing advance in step 2. This timing advance mechanism helps ensure the subsequent uplink signals from UEs located in different positions in the cell can arrive at the base station within the CP range.

Existing random access procedures may not work or are not optimized for LTE deployments with fast moving infrastructure. As such, there is a need for systems and methods for addressing this issue.

SUMMARY

Systems and methods relating to correction of a Doppler/frequency offset in a wireless communication system are disclosed. In some embodiments, a method of operation of a node comprises estimating a Doppler/frequency offset for a wireless device based on an uplink signal received from the wireless device and providing a frequency adjustment to the wireless device that corrects for the Doppler/frequency offset. In this manner, the Doppler/frequency offset for a wireless device is determined and corrected.

In some embodiments, the node is a radio access node. In some embodiments, the radio access node is a moving radio access node. In some other embodiments, the radio access node is a high-speed, moving radio access node. In some other embodiments, the radio access node is a moving radio access node that is in the sky. In some other embodiments, the radio access node is a satellite.

In some embodiments, the wireless device is served by a moving radio access node, the node is a network node communicatively coupled to the moving radio access node, and providing the frequency adjustment to the wireless device comprises providing the frequency adjustment to the wireless device via the moving radio access node.

In some embodiments, the uplink signal received from the wireless device is a random access preamble. Further, in some embodiments, providing the frequency adjustment to the wireless device comprises providing a random access response to the wireless device, the random access response comprising the frequency adjustment.

In some embodiments, the Doppler/frequency offset for the wireless device is a residual Doppler/frequency offset for the wireless device after compensation for a Doppler/frequency offset for a reference location within a cell in which the wireless device is located.

Embodiments of a node for determining and correcting for a Doppler/frequency offset for a wireless device are also disclosed. In some embodiments, a node is adapted to estimate a Doppler/frequency offset for a wireless device based on an uplink signal received from the wireless device and provide a frequency adjustment to the wireless device that corrects for the Doppler/frequency offset.

In some embodiments, a node comprises at least one processor and memory comprising instructions executable by the at least one processor whereby the node is operable to estimate a Doppler/frequency offset for a wireless device based on an uplink signal received from the wireless device and provide a frequency adjustment to the wireless device that corrects for the Doppler/frequency offset.

In some embodiments, a node comprises an estimating module operable to estimate a Doppler/frequency offset for a wireless device based on an uplink signal received from the wireless device and a providing module operable to provide a frequency adjustment to the wireless device that corrects for the Doppler/frequency offset.

Embodiments of a method of operation of a wireless device are also disclosed. In some embodiments, a method of operation of a wireless device comprises transmitting an uplink signal to a radio access node and receiving a frequency adjustment from the radio access node where the frequency adjustment corrects for a Doppler/frequency offset for the wireless device based on the uplink signal received, at the radio access node, from the wireless device. The method further comprises adjusting an uplink frequency of the wireless device in accordance with the frequency adjustment.

In some embodiments, the radio access node is a moving radio access node. In some other embodiments, the radio access node is a high-speed, moving radio access node. In some other embodiments, the radio access node is a moving radio access node that is in the sky. In some other embodiments, the radio access node is a satellite.

In some embodiments, the uplink signal is a random access preamble. Further, in some embodiments, receiving the frequency adjustment comprises receiving a random access response from the radio access node, wherein the random access response comprises the frequency adjustment.

In some embodiments, the Doppler/frequency offset for the wireless device is a residual Doppler/frequency offset for the wireless device after compensation for a Doppler/frequency offset for a reference location within a cell in which the wireless device is located.

Embodiments of a wireless device are also disclosed. In some embodiments, a wireless device is adapted to transmit an uplink signal to a radio access node and receiving a frequency adjustment from the radio access node where the frequency adjustment corrects for a Doppler/frequency offset for the wireless device based on the uplink signal received, at the radio access node, from the wireless device. The wireless device is further adapted to adjust an uplink frequency of the wireless device in accordance with the frequency adjustment.

In some embodiments, a wireless device comprises at least one transceiver and circuitry operable to transmit, via the at least one transceiver, an uplink signal to a radio access node and receive, via the at least one transceiver, a frequency adjustment from the radio access node. The frequency adjustment corrects for a Doppler/frequency offset for the wireless device based on the uplink signal received, at the radio access node, from the wireless device. The circuitry is further operable to adjust an uplink frequency of the wireless device in accordance with the frequency adjustment.

In some embodiments, a wireless device comprises a transmitting module, a receiving module, and an adjusting module. The transmitting module is operable to transmit an uplink signal to a radio access node. The receiving module is operable to receive a frequency adjustment from the radio access node, the frequency adjustment correcting for a Doppler/frequency offset for the wireless device based on the uplink signal received, at the radio access node, from the wireless device. The adjusting module is operable to adjust an uplink frequency of the wireless device in accordance with the frequency adjustment.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
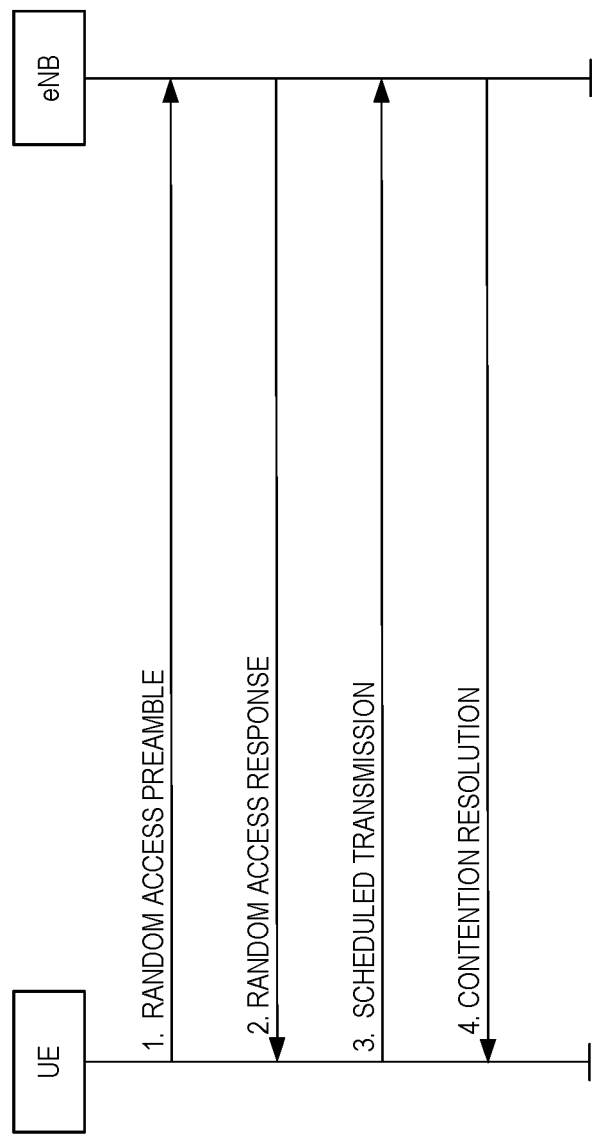
FIG. 1 illustrates the conventional Long Term Evolution (LTE) contention-based random access procedure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node:

As used herein, a "radio node" is either a radio access node or a wireless device.

Radio Access Node:

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node:

As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device:

As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node:

As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Existing random access procedures may not work or are not optimized for LTE deployments with fast moving infrastructure. For example, the orbital velocity of a typical Low Earth Orbit (LEO) satellite needed to maintain a stable orbit is about 7.8 kilometers per second (km/s). For such a LEO satellite system operating at, e.g., 5 gigahertz (GHz) carrier frequency, signals from/to a UE in the coverage area of the satellite may experience Doppler shift as large as 130 kilohertz (kHz). Moreover, the Doppler shift varies as the satellite moves, and UEs in different locations experience different Doppler shifts and varying rates. LTE networks cannot function properly if these Doppler effects are not addressed in the system design.

In this disclosure, systems and methods are disclosed for providing frequency adjustment to address high Doppler effects in high-speed LTE deployments such as LEO satellite systems. In this manner, LTE is extended to work for deployments with large Doppler effects, such as satellite systems. Note that while the description provided herein focuses on LTE, the present disclosure is not limited thereto. The concepts disclosed herein are applicable to any type of wireless communication network (e.g., any type of cellular communications network) in which an "in the sky" deployment of a radio access node (e.g., a base station) is desired.

The present disclosure relates to frequency adjustment for a moving or mobile radio access node such as an In-the-Sky (ITS) radio access node. As used herein, an ITS radio access node is a radio access node implemented in a flying structure such as, e.g., a LEO satellite, a drone, a balloon, or like. It should be noted that while the focus of the description provided herein is on an ITS radio access node, the concepts disclosed herein are equally applicable to any moving (e.g., high speed) radio access node for which a frequency adjustment to address high Doppler effects is needed or desired.

In the following, the proposed solution is described using satellite communication as a non-limiting example. The solution however applies to other deployments with fast moving infrastructure or UEs.

Figure 2:
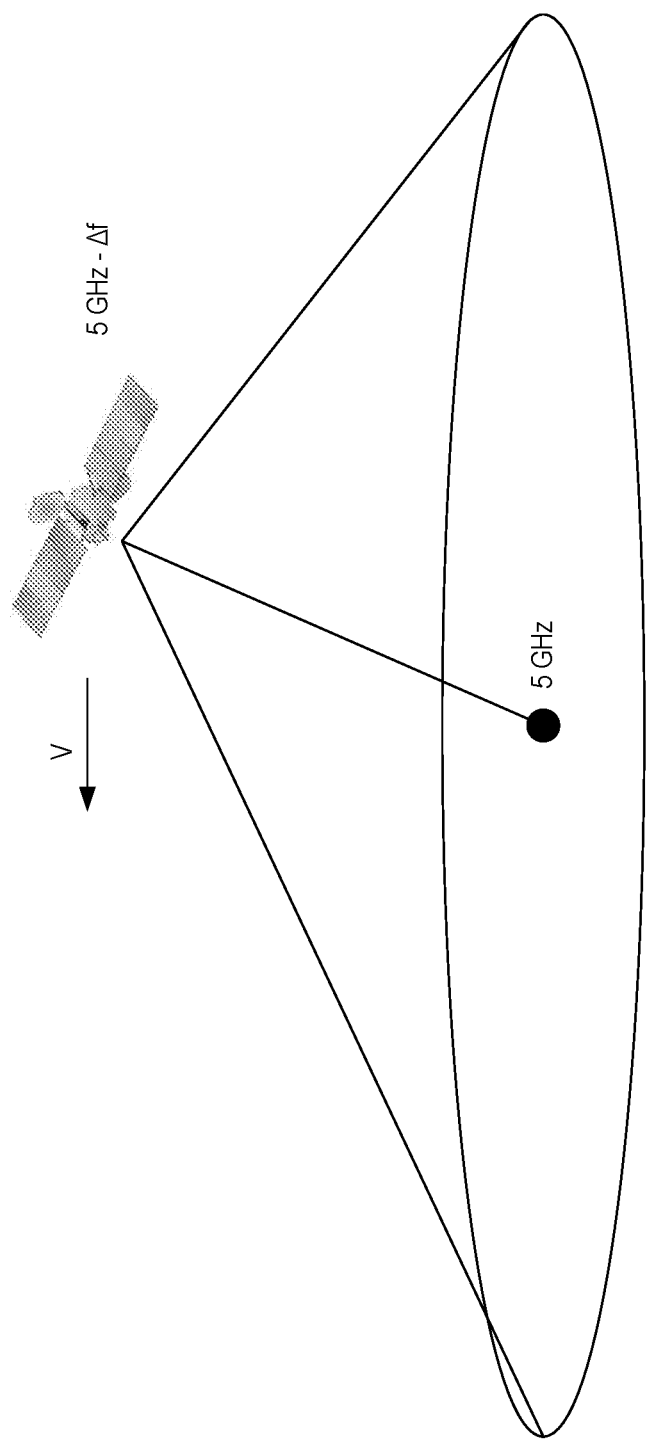
FIG. 2 illustrates cell-specific Doppler compensation.

Before discussing embodiments of the present disclosure, the following information is beneficial. A cell-specific Doppler compensation may be applied for downlink transmissions to facilitate a UE receiving a downlink signal. For satellite communication, this Doppler compensation can be applied, for example, with respect to a reference point in the coverage area of a satellite. FIG. 2 gives one such example with a 5 GHz carrier frequency. Due to the high speed movement of the satellite, a signal at 5 GHz would not be at 5 GHz at the reference point due to Doppler effect. In FIG. 2, a Doppler compensation ($\Delta f$) is applied such that the downlink signal appears at 5 GHz at the reference point.

Figure 3:
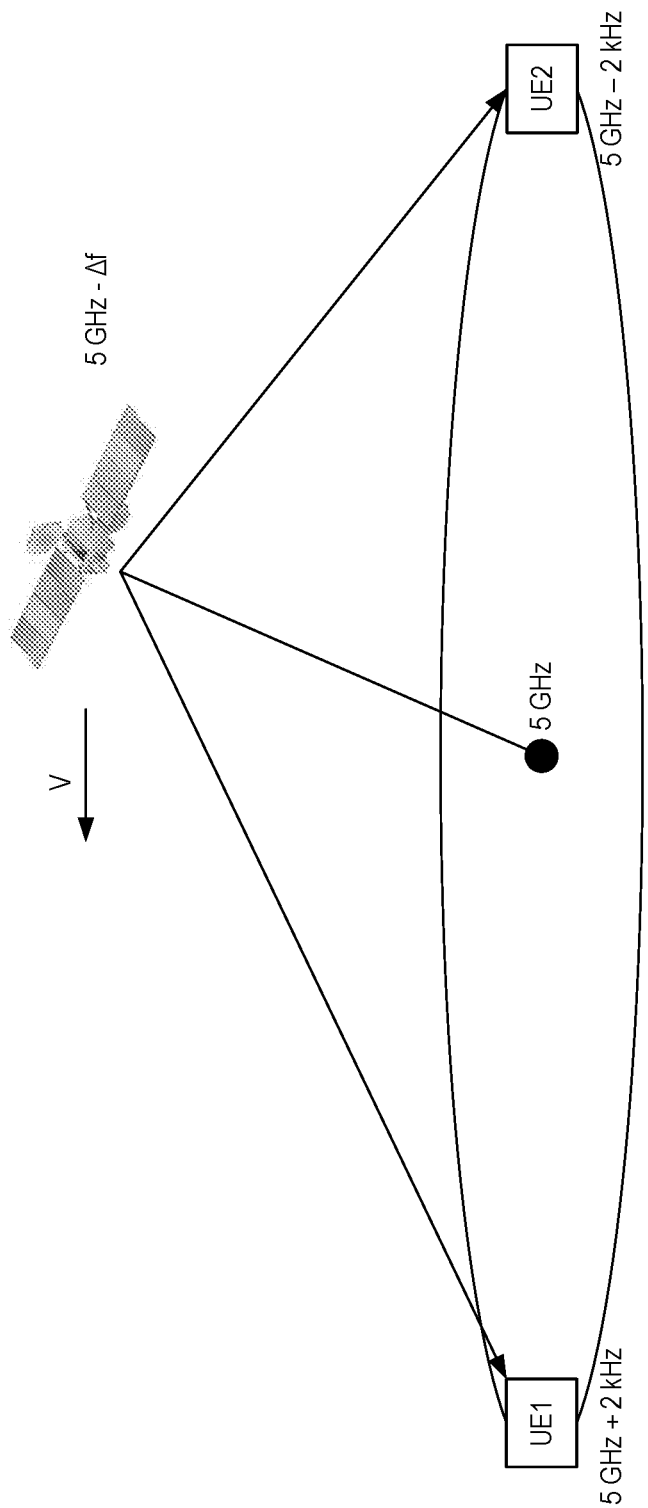
FIG. 3 illustrates residual downlink Doppler.

UEs at different positions in the cell may experience different Doppler effects. Even with a perfect pre-cell-specific Doppler compensation such that a UE located at the reference point experiences zero Doppler shift, UEs in other positions may still experience high residual downlink Doppler. FIG. 3 shows an example where two cell edge UEs (UE1 and UE2) experience +2 kHz and −2 kHz residual downlink Doppler, respectively. However, the residual Doppler value is not known to the UE during cell search. In particular, the UE compensates residual downlink Doppler during cell search by tuning its oscillator. As illustrated in FIG. 3, a UE may over- or under-compensate downlink carrier frequency depending on its position.

Figure 4:
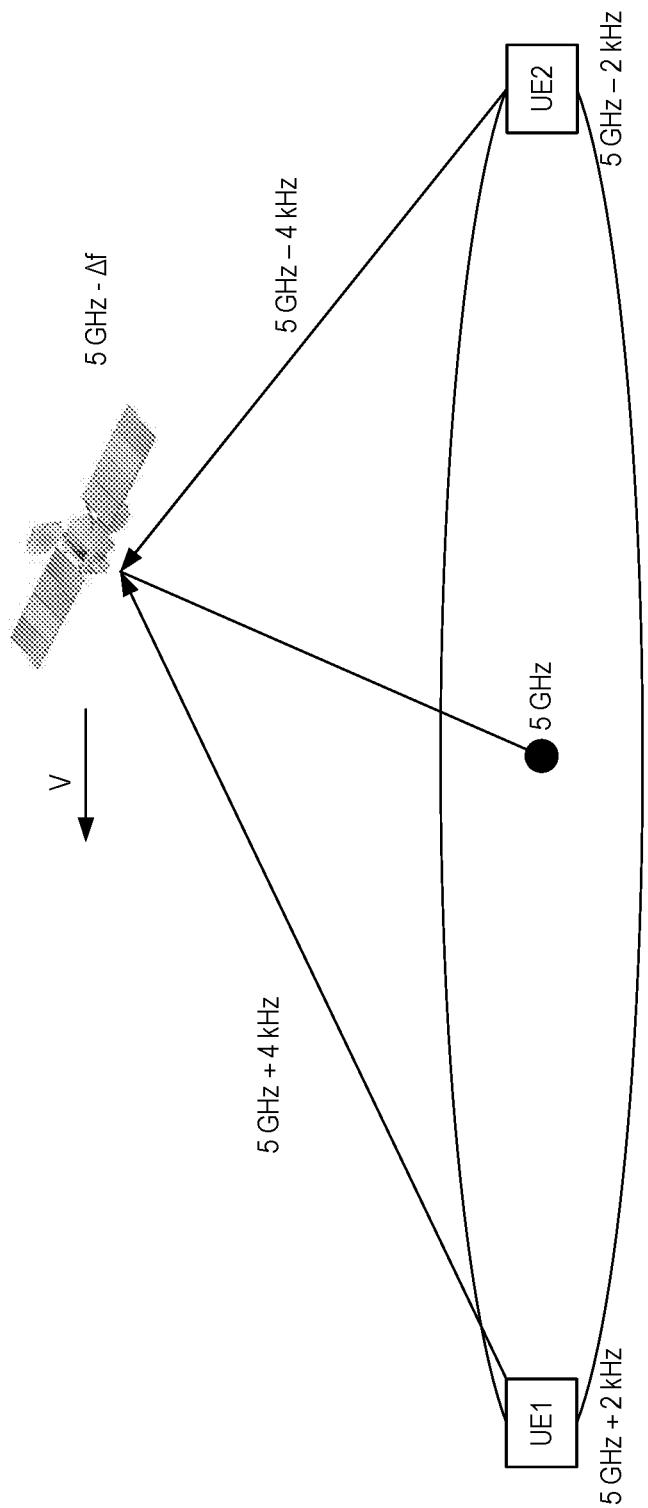
FIG. 4 illustrates composite downlink-uplink Doppler.

After cell search, the UE uses the acquired downlink frequency to transmit Msg1, i.e., random access preamble, in step 1 of random access. The uplink signal arriving at the satellite also experiences Doppler, as illustrated in FIG. 4. In particular, the signal from UE1 has a composite +4 kHz Doppler, and the signal from UE2 has a composite −4 kHz Doppler. This large initial residual uplink Doppler may be too large for 15 kHz Physical Uplink Shared Channel (PUSCH)/Physical Uplink Control Channel (PUCCH) uplink subcarrier spacing. If these initial residual uplink Doppler effects are not corrected, subsequent uplink transmissions, e.g. PUSCH/PUCCH transmissions, would experience significant inter-carrier interference and the uplink orthogonality of signals from different UEs would be lost.

In addition to or as an alternative, any initial or residual uplink frequency uncertainty should be adjusted before data transmission in the uplink since LTE uplink performance heavily hinges on uplink orthogonality. The following solutions are proposed to solve this issue.

Figure 5:
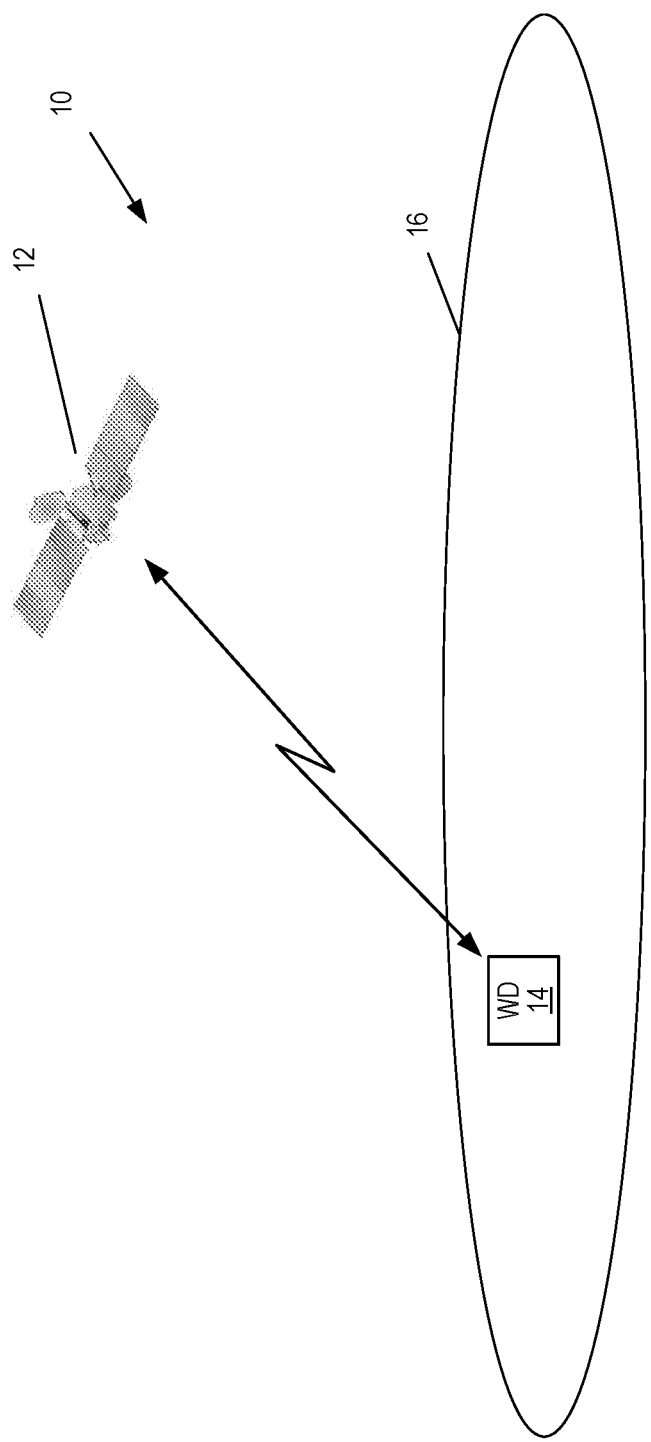
FIG. 5 illustrates one example of a wireless system (e.g., a cellular communications system) in which embodiments of the present disclosure may be implemented.

In this regard, FIG. 5 illustrates one example of a wireless system 10 (e.g., a cellular communications system) in which embodiments of the present disclosure may be implemented. The wireless system 10 includes an ITS radio access node 12, which in this example is a satellite (e.g., a LEO satellite). However, the radio access node 12 is not limited to a satellite (e.g., the radio access node 12 can be another movable, e.g., high-speed, device such as a drone, balloon, or the like). The radio access node 12 is preferably moving, and the velocity at which the radio access node 12 is moving may be high. The radio access node 12 provides wireless access to wireless devices, such as a wireless device 14, within a coverage area 16 (e.g., cell) of the radio access node 12. In some embodiments, the wireless device 14 is a LTE UE. Note that the term "UE" is used herein in its broad sense to mean any wireless device. As such, the terms "wireless device" and "UE" are used interchangeably herein.

Figure 6:
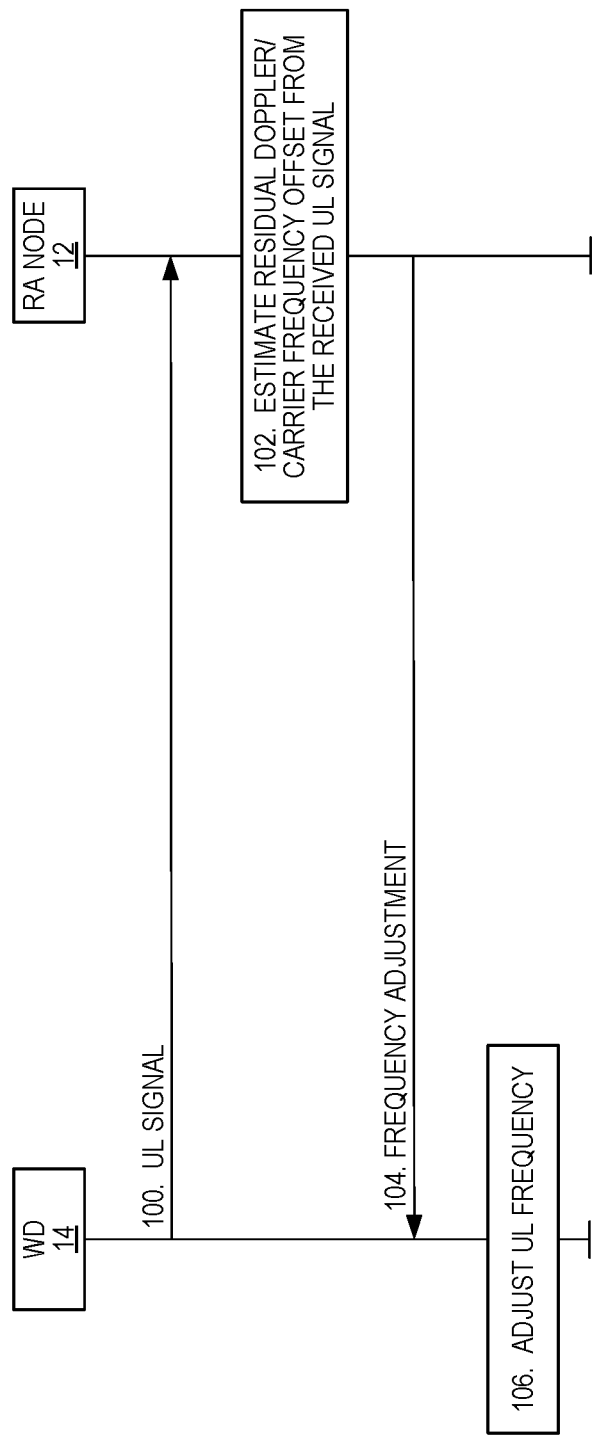
FIG. 6 illustrates a frequency adjustment procedure according to some embodiments of the present disclosure.

As illustrated in FIG. 6, in accordance with a first embodiment, the wireless device 14 transmits an uplink signal to the radio access node 12 (step 100). Again, as discussed above, the radio access node 12 is preferably an ITS radio access node such as, e.g., a LEO satellite, but is not limited thereto. The radio access node 12 (or alternatively some other network node) estimates a (residual) Doppler/carrier frequency offset of the wireless device 14 from the received uplink signal (step 102). The radio access node 12 then sends a corresponding frequency adjustment to the wireless device 14 (step 104). In other words, the radio access node 12 feeds back the frequency estimate and commands the wireless device 14 to adjust uplink frequency (step 106). The adjustment of the uplink frequency may be performed in any suitable manner such as, for example, tuning one or more oscillators at the wireless device 14 in accordance with the frequency adjustment. Note that while the estimation of the residual Doppler/carrier frequency offset is performed by the radio access node 12 in this example, the estimation may be performed by any network node.

Figure 7:
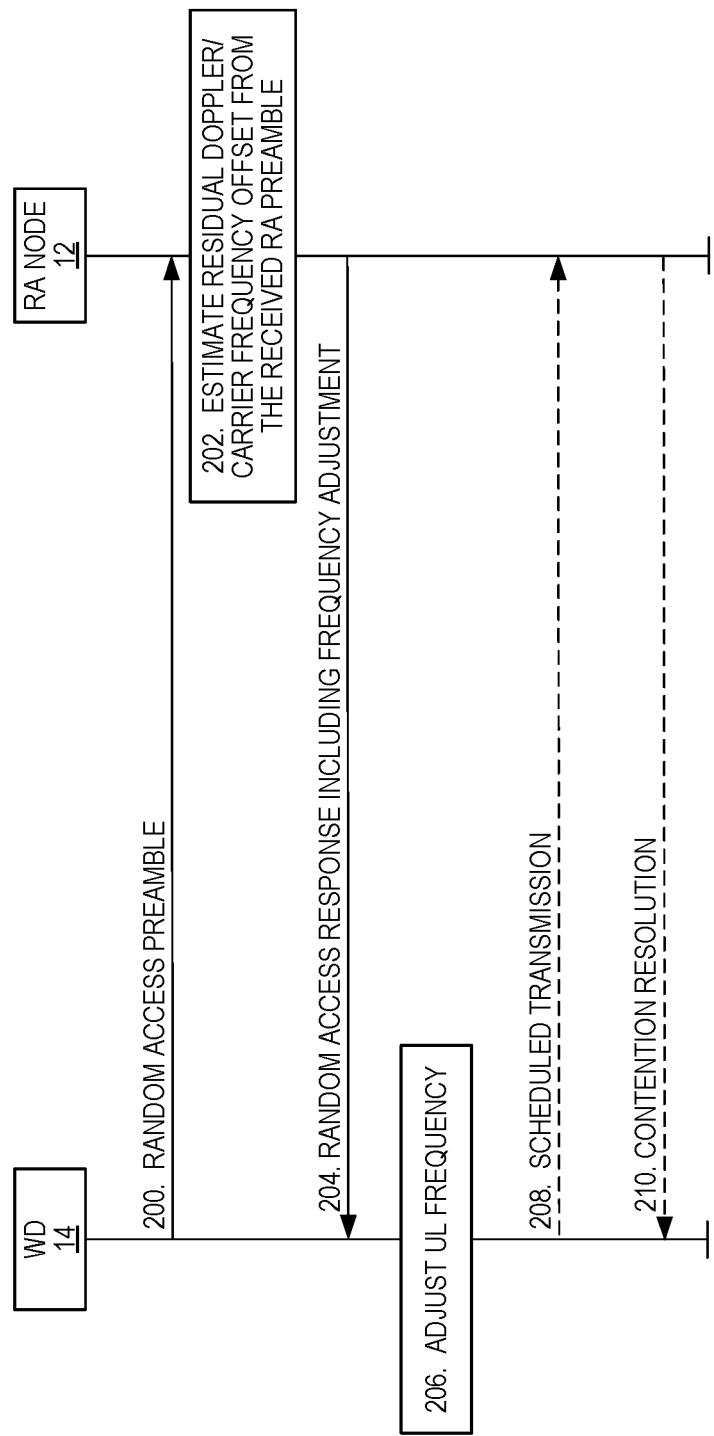
FIG. 7 illustrates a frequency adjustment procedure according to some other embodiments of the present disclosure.

FIG. 7 illustrates one specific example of the process of FIG. 6 according to some embodiments of the present disclosure. In this embodiment, the LTE random access procedure is modified to include the estimation of the (residual) Doppler/carrier frequency offset for the wireless device 14 and to feed back the frequency estimate to the wireless device 14. As illustrated, the wireless device 14 transmits a random access preamble to the radio access node 12 (step 200). This may occur in step 1 of the LTE random access procedure. The radio access node 12 (or alternatively some other network node) estimates the (residual) Doppler/carrier frequency offset for the wireless device 14 using the random access preamble received from the wireless device 14 (step 202). The radio access node 12 feeds back the frequency estimate in Msg2 (i.e., the random access response) to command the wireless device 14 to adjust its uplink frequency (step 204). This feedback of the frequency estimate is referred to herein as feedback of a frequency adjustment. The frequency adjustment may be provided in addition to a timing advance command. The wireless device 14 adjusts its uplink frequency in accordance with the received frequency estimate (step 206). Optionally, the wireless device 14 transmits a scheduled uplink transmission to the radio access node 12 (step 208). Optionally, the radio access node 12 returns contention resolution information to the wireless device 14 (e.g., a contention resolution identity) to provide contention resolution (step 210).

In the subsequent communications, the radio access node 12 may continuously/periodically monitor the (residual) Doppler/carrier frequency offset of the wireless device 14 and signal the wireless device 14 to adjust uplink frequency as appropriate. The signaling may be Radio Resource Control (RRC) control signaling, L1/L2 control channels such as the Physical Downlink Control Channel (PDCCH) and enhanced PDCCH (EPDCCH), or a combination of both.

Figure 8:
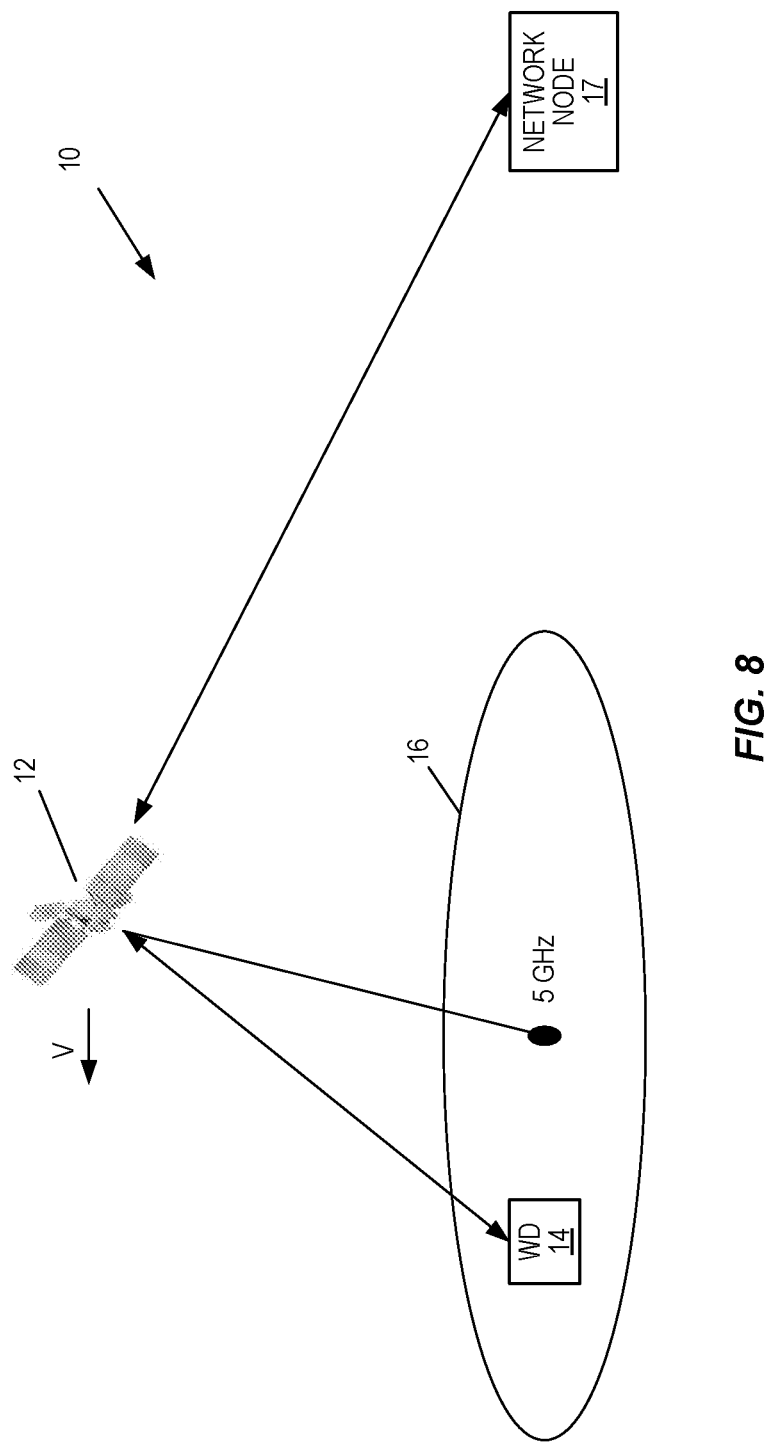
FIG. 8 illustrates the wireless system according to another embodiment of the present disclosure.

As discussed above, some of the functionality of the radio access node 12 may alternatively be performed by another network node. In this regard, FIG. 8 illustrates the wireless system 10 according to some other embodiments of the present disclosure. As illustrated, the wireless system 10 further includes a network node 17. In this embodiment, the radio access node 12 can be viewed as a relay, at least with respect to the estimation of the (residual) Doppler/carrier frequency offset. For example, the uplink signal received by the radio access node 12 from the wireless device 14 in step 100 of FIG. 6 or in step 200 of FIG. 7 is relayed from the radio access node 12 to the network node 17. Based on the uplink signal, the network node 17 estimates the (residual) Doppler/carrier frequency offset and sends the frequency adjustment to the wireless device 14 via the radio access node 12. Note that while the details are not repeated here, the details provided herein regarding the radio access node 12 and how the radio access node 12 operates to estimate the residual frequency offset and send the corresponding frequency adjustment to the wireless device 14 are applicable here but where the radio access node 12 operates as a relay.

Figure 9:
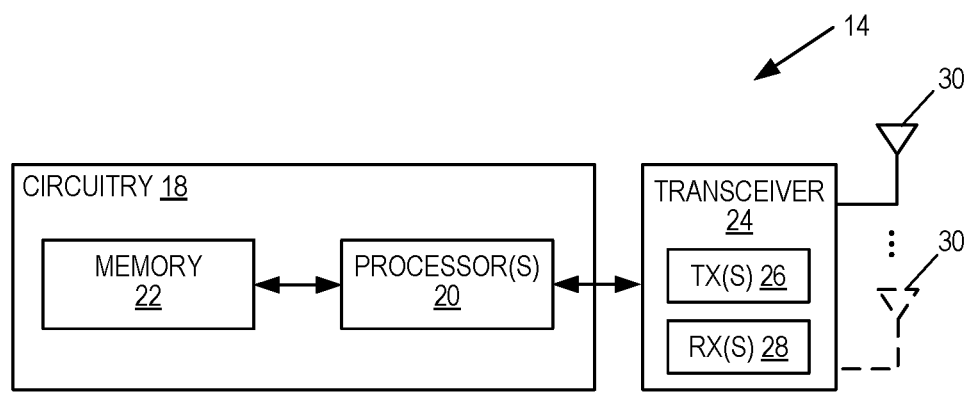
FIGS. 9 and 10 illustrate example embodiments of a wireless device according to some embodiments of the present disclosure.

FIG. 9 is a schematic block diagram of the wireless device 14 (e.g., a UE) according to some embodiments of the present disclosure. As illustrated, the wireless device 14 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some embodiments, the functionality of the wireless device 14 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
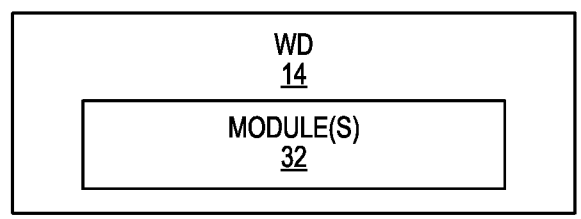

FIG. 10 is a schematic block diagram of the wireless device 14 according to some other embodiments of the present disclosure. The wireless device 14 includes one or more modules 32, each of which is implemented in software. The module(s) 32 provide the functionality of the wireless device 14 (e.g., UE) described herein.

Figure 11:
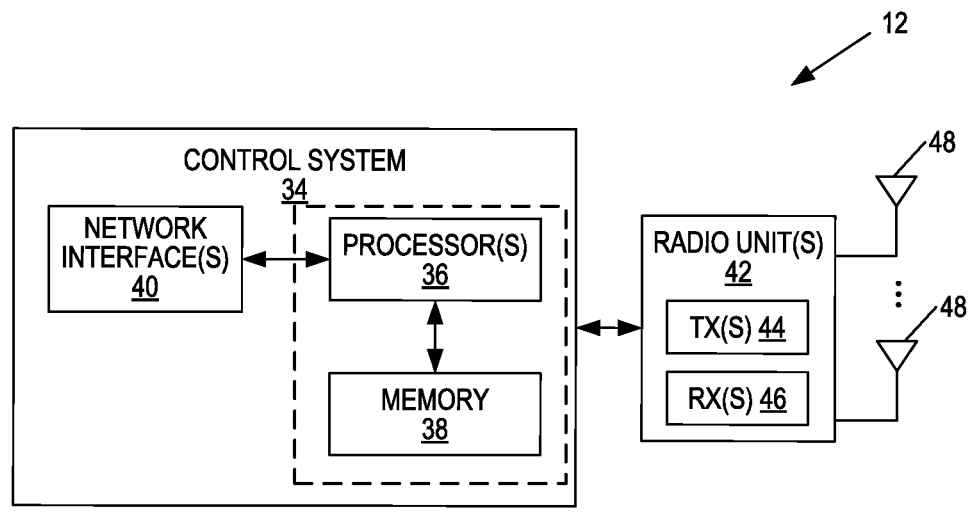
FIGS. 11 through 13 illustrate example embodiments of a radio access node according to some embodiments of the present disclosure.

FIG. 11 is a schematic block diagram of the radio access node 12 according to some embodiments of the present disclosure. Other types of network nodes (e.g., the network node 17) may have similar architectures (particularly with respect to including processor(s), memory, and a network interface). As illustrated, the radio access node 12 includes a control system 34 that includes circuitry comprising one or more processors 36 (e.g., CPUs, ASICs, FPGAs, and/or the like) and memory 38. The control system 34 also includes a network interface 40. The radio access node 12 also includes one or more radio units 42 that each includes one or more transmitters 44 and one or more receivers 46 coupled to one or more antennas 48. In some embodiments, the functionality of the radio access node 12 described above may be fully or partially implemented in software that is, e.g., stored in the memory 38 and executed by the processor(s) 36.

Figure 12:
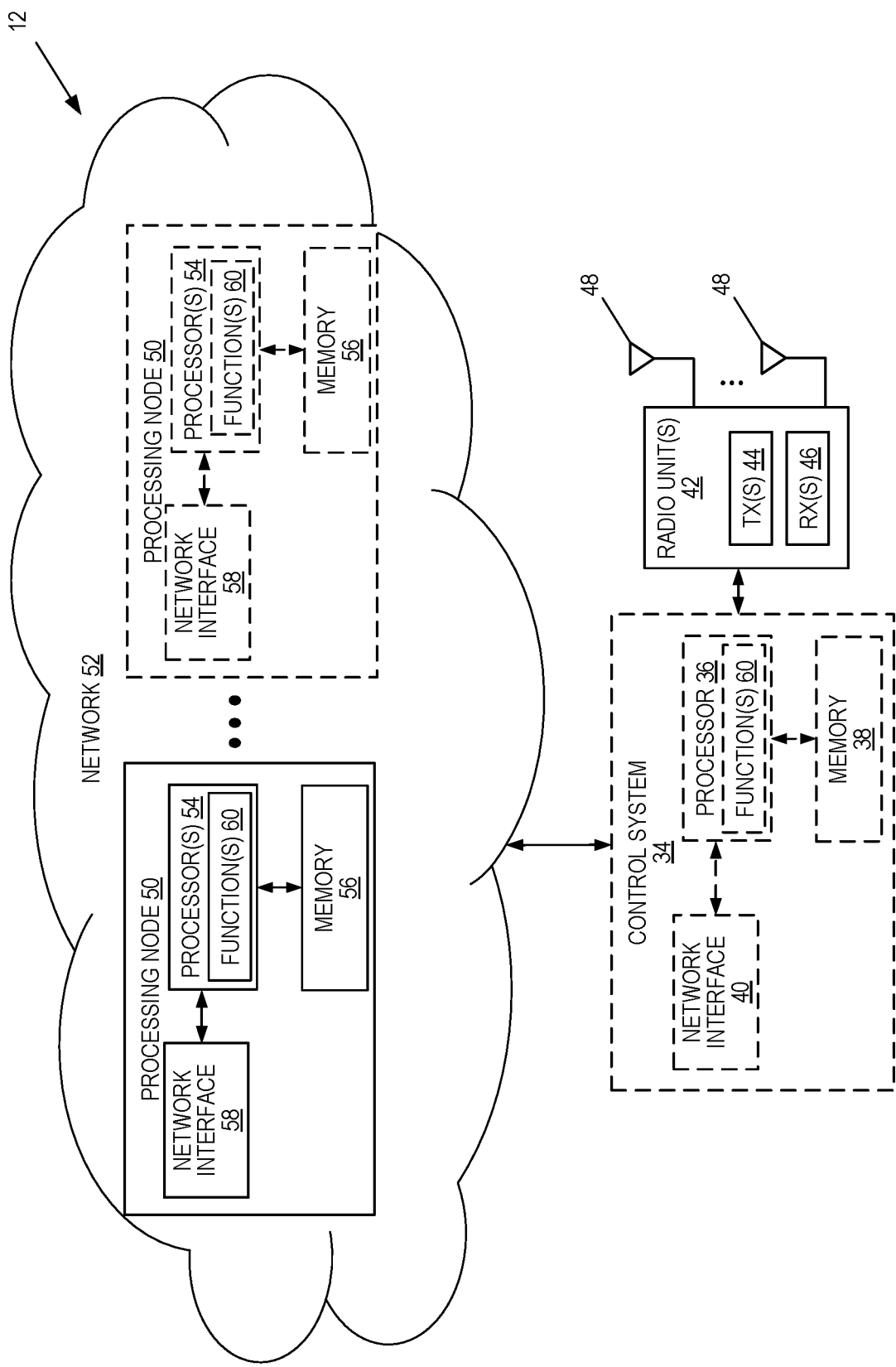

FIG. 12 is a schematic block diagram that illustrates a virtualized embodiment of the radio access node 12 according to some embodiments of the present disclosure. Other types of network nodes may have similar architectures (particularly with respect to including processor(s), memory, and a network interface).

As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 optionally includes the control system 34, as described with respect to FIG. 11. The radio access node 12 also includes the one or more radio units 42 that each includes the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the radio access node 12 described herein are implemented at the one or more processing nodes 50 or distributed across the control system 34 (if present) and the one or more processing nodes 50 in any desired manner. In some particular embodiments, some or all of the functions 60 of the radio access node 12 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicates directly with the processing node(s) 50 via an appropriate network interface(s).

In some embodiments, a computer program including instructions which, when executed by at least one processor, causes the at least one processor to carry out the functionality of the radio access node 12 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
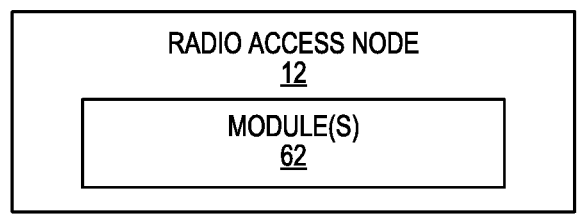

FIG. 13 is a schematic block diagram of the radio access node 12 according to some other embodiments of the present disclosure. The radio access node 12 includes one or more modules 62, each of which is implemented in software. The module(s) 62 provide the functionality of the radio access node 12 described herein.

While not being limited thereto, some example embodiments of the present disclosure are provided below.

Embodiment 1

A method of operation of a node (12, 50) comprising estimating (102) a Doppler/frequency offset for a wireless device (14) based on an uplink signal received from the wireless device (14) and providing (104) a frequency adjustment to the wireless device (14) that corrects for the Doppler/frequency offset.

Embodiment 2

The method of embodiment 1 wherein the node (12, 50) is a radio access node (12).

Embodiment 3

The method of embodiment 2 wherein the radio access node (12) is a moving radio access node (12).

Embodiment 4

The method of embodiment 2 wherein the radio access node (12) is a high-speed, moving radio access node (12).

Embodiment 5

The method of embodiment 2 wherein the radio access node (12) is a moving radio access node (12) that is in the sky.

Embodiment 6

The method of embodiment 2 wherein the radio access node (12) is a satellite.

Embodiment 7

The method of any one of embodiments 1 to 6 wherein the uplink signal received from the wireless device (14) is a random access preamble.

Embodiment 8

The method of embodiment 7 wherein providing (104) the frequency adjustment to the wireless device (14) comprises providing (204) a random access response to the wireless device (14), the random access response comprising the frequency adjustment.

Embodiment 9

A node (12, 50) adapted to operate according to the method of any one of embodiments 1 to 8.

Embodiment 10

A node (12, 50), comprising at least one processor (36, 54) and memory (38, 56) comprising instructions executable by the at least one processor (36, 54) whereby the node (12, 50) is operable to: estimate a Doppler/frequency offset for a wireless device (14) based on an uplink signal received from the wireless device (14) and provide a frequency adjustment to the wireless device (14) that corrects for the Doppler/frequency offset.

Embodiment 11

A node (12, 50), comprising an estimating module operable to estimate a Doppler/frequency offset for a wireless device (14) based on an uplink signal received from the wireless device (14) and a providing module operable to provide a frequency adjustment to the wireless device (14) that corrects for the Doppler/frequency offset.

Embodiment 12

A method of operation of a wireless device (14) comprising transmitting (100) an uplink signal to a radio access node (12), receiving (104) a frequency adjustment from the radio access node (12), the frequency adjustment correcting for a Doppler/frequency offset for the wireless device (14) based on the uplink signal received, at the radio access node (12), from the wireless device (14), and adjusting (106) an uplink frequency of the wireless device (14) in accordance with the frequency adjustment.

Embodiment 13

The method of embodiment 12 wherein the radio access node (12) is a moving radio access node (12).

Embodiment 14

The method of embodiment 12 wherein the radio access node (12) is a high-speed, moving radio access node (12).

Embodiment 15

The method of embodiment 12 wherein the radio access node (12) is a moving radio access node (12) that is in the sky.

Embodiment 16

The method of embodiment 12 wherein the radio access node (12) is a satellite.

Embodiment 17

The method of any one of embodiments 12 to 16 wherein the uplink signal is a random access preamble.

Embodiment 18

The method of embodiment 17 wherein receiving (104) the frequency adjustment comprises receiving (204) a random access response from the radio access node (12), the random access response comprising the frequency adjustment.

Embodiment 19

A wireless device (14) adapted to operate according to the method of any one of embodiments 12 to 18.

Embodiment 20

A wireless device (14) comprising at least one transceiver (24) and circuitry (18) operable to: transmit, via the at least one transceiver (24), an uplink signal to a radio access node (12), receive, via the at least one transceiver (24), a frequency adjustment from the radio access node (12), the frequency adjustment correcting for a Doppler/frequency offset for the wireless device (14) based on the uplink signal received, at the radio access node (12), from the wireless device (14), and adjust an uplink frequency of the wireless device (14) in accordance with the frequency adjustment.

Embodiment 21

A wireless device (14) comprising a transmitting module operable to transmit an uplink signal to a radio access node (12), a receiving module operable to receive a frequency adjustment from the radio access node (12), the frequency adjustment correcting for a Doppler/frequency offset for the wireless device (14) based on the uplink signal received, at the radio access node (12), from the wireless device (14), and an adjusting module operable to adjust an uplink frequency of the wireless device (14) in accordance with the frequency adjustment.

The following acronyms are used throughout this disclosure.

3GPP Third Generation Partnership Project
5G Fifth Generation
ASIC Application Specific Integrated Circuit
CP Cyclic Prefix
CPU Central Processing Unit
eNB Enhanced or Evolved Node B
FPGA Field Programmable Gate Array
EPDCCH Evolved Physical Downlink Control Channel
GHz Gigahertz
ITS In-the-Sky
kHz Kilohertz
km/s Kilometers per Second
LEO Low Earth Orbit
LTE Long Term Evolution
MME Mobility Management Entity
MTC Machine Type Communication
OFDMA Orthogonal Frequency-Division Multiple Access
PDCCH Physical Downlink Control Channel
P-GW Packet Data Network Gateway
PUCCH Physical Uplink Control Channel
PUSCH Physical Uplink Shared Channel
RA-RNTI Random Access Radio Network Temporary Identifier
RRC Radio Resource Control
SC-FDMA Single-carrier Frequency-division Multiple Access
SCEF Service Capability Exposure Function
ToA Time of Arrival
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a node, the method comprising:
   estimating a Doppler/frequency offset for a wireless device based on an uplink signal received from the wireless device, wherein the Doppler/frequency offset for the wireless device is a residual Doppler/frequency offset for the wireless device after compensation for the Doppler/frequency offset for a reference location within a cell in which the wireless device is located;
   providing a frequency adjustment to the wireless device that corrects for the Doppler/frequency offset;
   receiving a scheduled uplink transmission from the wireless device, wherein the scheduled uplink transmission is associated with the provided frequency adjustment;
   in response to receiving the scheduled uplink transmission, sending contention resolution information to the wireless device to provide contention resolution; and
   continuously or periodically monitoring the residual Doppler/frequency offset of the UE and signalling the UE to adjust uplink frequency as appropriate in subsequent communications.

2. The method of claim 1, wherein the node is a radio access node.

3. The method of claim 2, wherein the radio access node is a moving radio access node.

4. The method of claim 2, wherein the radio access node is a high-speed, moving radio access node.

5. The method of claim 2, wherein the radio access node is a moving radio access node that is in the sky.

6. The method of claim 2, wherein the radio access node is a satellite.

7. The method of claim 1, wherein:
   the wireless device is served by a moving radio access node,
   the node is a network node communicatively coupled to the moving radio access node, and
   providing the frequency adjustment to the wireless device comprises providing the frequency adjustment to the wireless device via the moving radio access node.

8. The method of claim 1, wherein the uplink signal received from the wireless device is a random access preamble.

9. The method of claim 8, wherein providing the frequency adjustment to the wireless device comprises providing a random access response to the wireless device, the random access response comprising the frequency adjustment.

10. A node, comprising:

at least one processor; and memory comprising instructions executable by the at least one processor whereby the node is operable to:

estimate a Doppler/frequency offset for a wireless device based on an uplink signal received from the wireless device, wherein the Doppler/frequency offset for the wireless device is a residual Doppler/frequency offset for the wireless device after compensation for the Doppler/frequency offset for a reference location within a cell in which the wireless device is located;

provide a frequency adjustment to the wireless device that corrects for the Doppler/frequency offset;

receive a scheduled uplink transmission from the wireless device, wherein the scheduled uplink transmission is associated with the provided frequency adjustment;

in response to the reception of the scheduled uplink transmission, send contention resolution information to the wireless device to provide contention resolution; and continuously or periodically monitor the residual Doppler/frequency offset of the UE and signal the UE to adjust uplink frequency as appropriate in subsequent communications.

* * * * *